United States Patent [19]
Schwarzenberg

[11] Patent Number: 5,804,261
[45] Date of Patent: Sep. 8, 1998

[54] BASE BODY FOR A FORAL BOUQUET

[76] Inventor: Hans-Josef Schwarzenberg, Am Vorderflöss 40, 33175 Bad Lippspringe, Germany

[21] Appl. No.: 822,437

[22] Filed: Mar. 21, 1997

[51] Int. Cl.$^6$ ........................................................ A01G 5/04
[52] U.S. Cl. .......................... 428/27; 47/41.01; 47/41.11; 47/41.12; 248/27.8
[58] Field of Search ............................. 428/27; 47/41.12, 47/41.11, 41.01, 41.13; 248/27.8; 206/423

[56] References Cited

U.S. PATENT DOCUMENTS

| | | | |
|---|---|---|---|
| 2,150,550 | 3/1939 | Keller | 47/41.12 |
| 3,336,697 | 8/1967 | Davis | 47/41.12 |

*Primary Examiner*—Alexander Thomas
*Attorney, Agent, or Firm*—Henry M. Feiereisen

[57] ABSTRACT

A base body for a floral bouquet, includes a bottom plate made of a degradable material and having a receptacle-distal underside exhibiting corners and formed with grooves extending in diagonal direction from the corners, a receptacle connected to the bottom plate and made of degradable foam material adapted for mounting flower stems, and a wire cage fully enveloping at least the receptacle and connectable to the bottom plate. The wire cage is formed by wires which are so bent at the corners of the cage as to be disposed in the grooves of the bottom plate, whereby the grooves are defined by a depth which is greater than a thickness of the wires.

11 Claims, 2 Drawing Sheets

BASE BODY FOR A FORAL BOUQUET

BACKGROUND OF THE INVENTION

The present invention refers to a base body for a floral bouquet, and in particular to a base body of a type exhibiting a generally block-shaped configuration and including a bottom plate made of degradable material, a receptacle connected to the bottom plate and made of degradable material, and a wire cage fully enveloping at least the receptacle.

SUMMARY OF THE INVENTION

It is an object of the present invention to provide an improved base body in which the connection between the bottom plate and the receptacle is attained in a simple manner.

This object, and others which will become apparent hereinafter, is attained in accordance with the present invention by forming the bottom plate on its receptacle-distal underside with grooves extending from the corners of the bottom plate in diagonal direction, and by forming the wire cage of retaining wires which are connected to the bottom plate and so bent at the corner areas of the wire cage that the wires are disposed in the grooves of the bottom plate, whereby the grooves are defined by a depth which is greater than a thickness of the wires.

A base body of this type is easy to make in a cost-efficient manner because the attachment or connection between the bottom plate, on the one hand, and the receptacle, on the other hand, is effected directly by the wire cage and its retaining wires. After being placed over the receptacle, the wires of the cage are bent in the area of the grooves and pressed onto the respective groove base. In this position, the wires may be secured by e.g. clips or clamps with the bottom plate to thereby accomplish at the same time a firm connection between the bottom plate and the receptacle. As the wires are received in the formed grooves of the bottom plate, and the depth of the grooves exceeds the thickness of the wires, no disturbing parts jut outwards from the underside of the bottom plate. This is advantageous because any risk of injury by outwardly projecting parts during handling of the base body is eliminated and the base body can be placed on any support surface without causing damage thereto.

The configuration of the grooves can be best suited to the dimensions of the bottom plate. In the event, the bottom plate is of comparable small size, it may be suitable to so configure the grooves as to extend diagonally from the corners between opposing corners. Larger bottom plates may have formed therein grooves which extend from the corners in a diagonal manner only at such a length as is suitable to accommodate the wires. For example, the grooves may extend from a common end face of the bottom plate from opposite corners and meet in a central area of the bottom plate. Suitably, the ends of the wires are so placed as to overlap one another in pairs so as to form an overlapping section which is then firmly secured to the bottom plate.

According to another feature of the present invention, a handle is secured to a central area of a receptacle-proximal inner side of the bottom plate and projects outwardly beyond an end face of the bottom plate to allow a user to securely grip the base body.

BRIEF DESCRIPTION OF THE DRAWING

The above and other objects, features and advantages of the present invention will now be described in more detail with reference to the accompanying drawing in which.

DETAILED DESCRIPTION OF PREFERRED EMBODIMENTS

Figure 1:
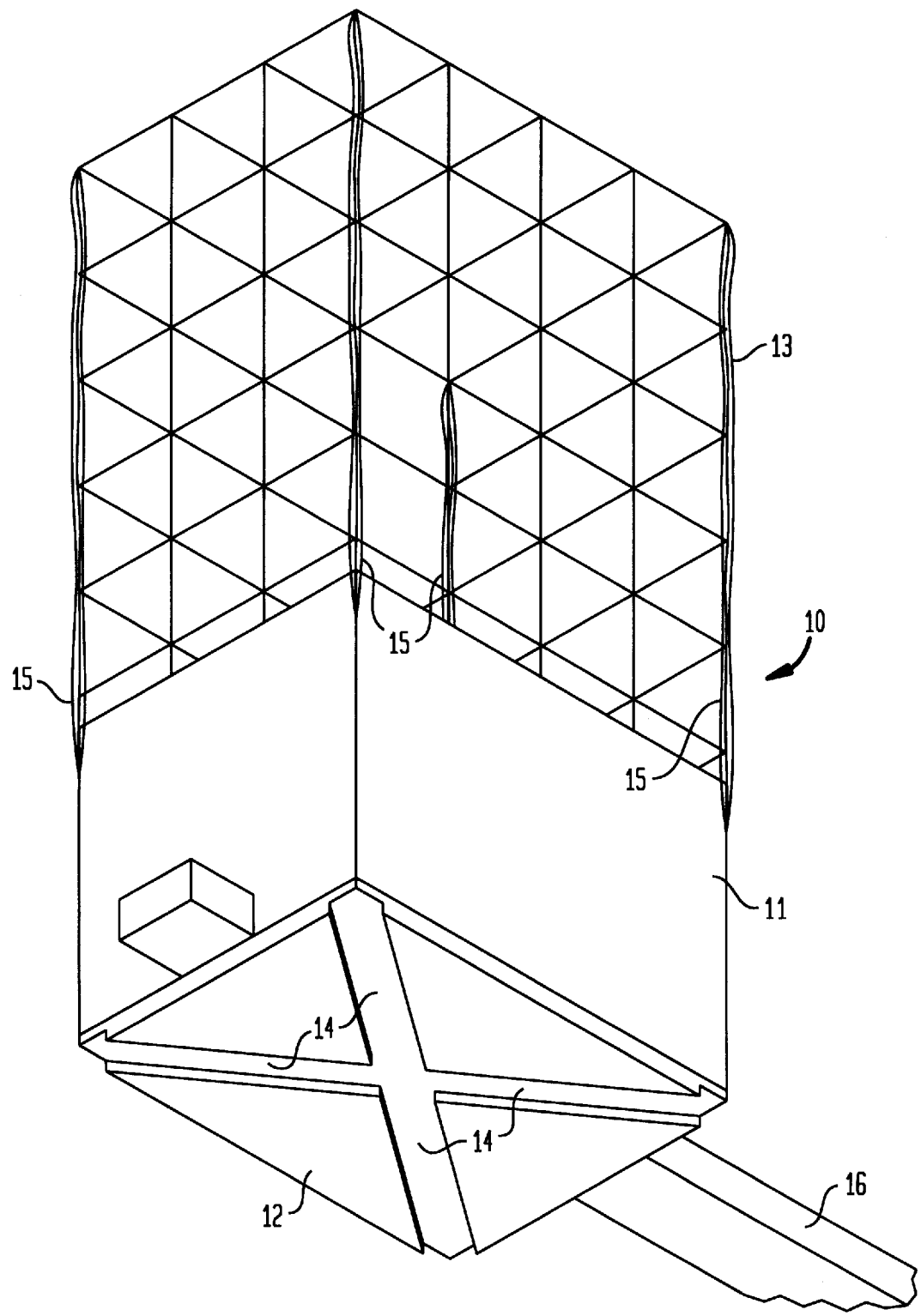
FIG. 1 is a perspective view of one embodiment of a base body for a floral bouquet in accordance with the present invention, illustrating a pre-assembled state of the base body.

Throughout all the Figures, the same or corresponding elements are always indicated by the same reference numerals.

Turning now to the drawing, and in particular to FIG. 1, there is shown a perspective view of one embodiment of a base body for a floral bouquet in accordance with the present invention, generally designated by reference numeral 10 and exhibiting a generally block-shaped configuration. The base body 10 essentially includes a generally block-shaped receptacle 11 which is connected at its lower end to a bottom plate 12, and a wire cage 13 which is shown in FIG. 1 in a state before being placed over the receptacle 11.

The receptacle 11 is made of degradable material, e.g. synthetic plastic foam for allowing mounting of flower stems. The bottom plate 12 is also made of degradable material, e.g. hard fibers or wood.

The wire cage 13 is made of relatively thin wires 15 that are easily decayable so that the whole base body 10 is not harmful in any way to the environment.

The bottom plate 12 has a receptacle-distal underside which is formed with grooves 14 extending from the corners of the bottom plate 12 in diagonal direction toward the center of the bottom plate 12. In the non-limiting example of FIG. 1, the grooves 14 extend continuously from one corner at one end face of the bottom plate 12 to the diagonally opposite corner at the opposing end face of the bottom plate 12.

As shown in FIG. 1, which shows the pre-assembled state of the base body 10, the wires 15 of the wire cage 13 project in the corner areas outwardly so that after placement of the wire cage 13 over the receptacle 11, the projecting ends of the wires 15 can be bent around the corners of the receptacle 11 and pressed into the grooves 14 of the bottom plate 12. These retaining wires 15 are then secured to the bottom plate 12 by clamps, clips, nails or the like fasteners. This type of connection effects at a same time a secure attachment of the bottom plate 12 to the receptacle 11 so that further connection elements between the bottom plate 12 and the receptacle 11 are not required.

The depth of the grooves 14 is so selected as to exceed the thickness of the wires 15 so that the wires 15 and the fasteners 17 (FIG. 2) are prevented from jutting outwards beyond the underside once they are disposed in the grooves 14 and secured. Any risk of injury and any damage to a support surface are thereby eliminated when handling the base body and placing it on the support surface.

As shown in FIG. 1, the bottom plate 12 has a receptacle-proximal inner side which supports in its central area a handle 16 which is guided through respective bores in the receptacle 11. The handle 16 is also made of degradable material, preferably wood.

In general, a base body that is equipped with a handle is called a "bouquet holder". Without a handle, the base body is typically referred to as "coffin support (Sargauflage)".

Figure 2:
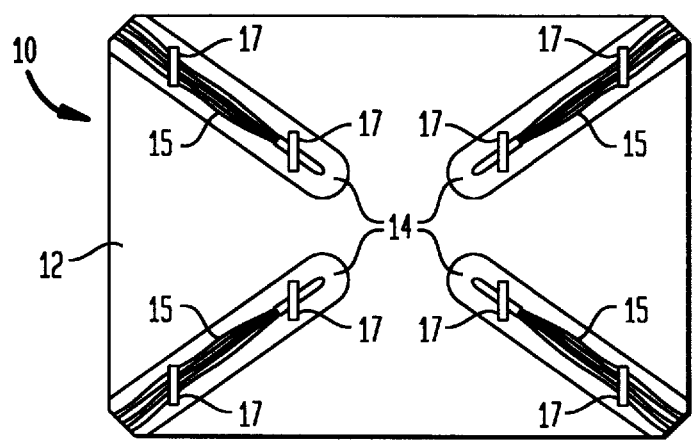
FIG. 2 is a bottom view of another embodiment of a base body for a floral bouquet in accordance with the present invention.

Turning now to FIG. 2, there is shown a bottom view of a base body 10 in form of a "coffin support" to show a variation of the configuration of the grooves 14 which extend from the corners diagonally in direction of the opposing corners over only a segment that is long enough to allow the ends of the wires 15 to be completely received in the grooves 14. Fasteners such as clamps 17 are utilized to secure the wire ends to the bottom plate 12 and thereby also attach the bottom plate 12 to the receptacle 11. This type of bottom plate 12 with shortened length of the grooves 14 is preferred when the bottom plate 12 is of relatively large dimensions.

Figure 3:
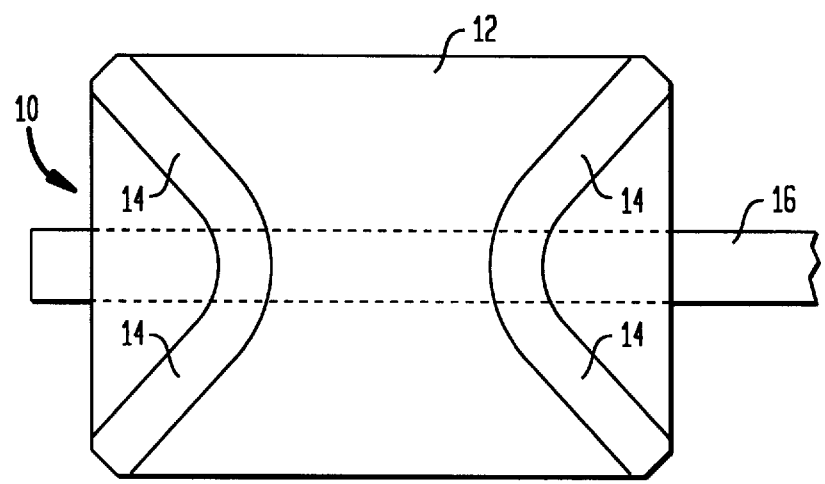
FIG. 3 is a bottom view of still another embodiment of a base body for a floral bouquet in accordance with the present invention.

FIG. 3 shows a variation of the bottom plate 12 which has formed therein grooves 14 that extend from the corners in diagonal direction, with the grooves 14 extending from a same end face of the bottom plate 12 meeting in a central area of the bottom plate 12. Thus, the ends of the wires (not shown in FIG. 3) can be twisted so that pairs of wire ends overlap each other. In the overlapping section, the pairs of wire ends can then be secured to the bottom plate 12. In the event, the base body 10 is provided with a handle 16, as shown in FIG. 3, the fasteners can then be driven in up to the handle 16, to thereby effect an extremely firm attachment, without any danger that the bottom plate 12 bursts along the weaker groove areas.

While the invention has been illustrated and described as embodied in a base body for a floral bouquet, it is not intended to be limited to the details shown since various modifications and structural changes may be made without departing in any way from the spirit of the present invention.

What is claimed as new and desired to be protected by Letters Patent is set forth in the appended claims:

1. A base body for a floral bouquet, comprising:
    a bottom plate made of a degradable material and having a receptacle-distal underside exhibiting corners and formed with grooves extending in diagonal direction from the corners;
    a receptacle connected to the bottom plate and made of degradable foam material adapted for mounting flower stems; and
    a wire cage fully enveloping at least the receptacle and connectable to the bottom plate, said wire cage being formed by wires which are so bent at corners of the cage as to be disposable in the grooves of the bottom plate, with the grooves exhibiting a depth which is greater than a thickness of the wires.

2. The base body of claim 1 wherein the bottom plate is made of a degradable material selected from the group consisting of hard fiber and wood.

3. The base body of claim 1 wherein the grooves extend continuously in a diagonal direction between opposing corners.

4. The base body of claim 1 wherein the grooves have a length substantially adapted to complement a length of the wires.

5. The base body of claim 1 wherein the grooves extend from a common end face of the bottom plate and are so configured as to meet in a central area of the bottom plate.

6. The base body of claim 1 wherein the wires of the wire cage are individually connected to the bottom plate.

7. The base body of claim 1 wherein the wires have ends which overlap one another in pairs so as to form an overlapping section which is secured to the bottom plate.

8. The base body of claim 7, and further comprising fastening means driven into the grooves up to the handle for securing the wires.

9. The base body of claim 8 wherein the fastening means include clips.

10. The base body of claim 1 wherein the bottom plate has a receptacle-proximal inner side, and further comprising a handle positioned in a central area of the inner side of the bottom plate and projecting outwardly beyond an end face of the bottom plate.

11. The base body of claim 1 exhibiting a block-shaped configuration.

* * * * *

UNITED STATES PATENT AND TRADEMARK OFFICE
CERTIFICATE OF CORRECTION

PATENT NO. : 5,804,261
DATED      : September 8, 1998
INVENTOR(S): Hans-Josef Schwarzenberg It is certified that error appears in the above-identified patent and that said Letters Patent is hereby corrected as shown below:

On the title page, Item [54] and Column 1, line 1,

Change "BASE BODY FOR A FORAL BOUQUET" to
--BASE BODY FOR A FLORAL BOUQUET--

Signed and Sealed this

Eleventh Day of May, 1999

Attest:

Q. TODD DICKINSON

*Attesting Officer*     Acting Commissioner of Patents and Trademarks